(12) United States Patent
Burg et al.

(10) Patent No.: US 7,436,885 B2
(45) Date of Patent: *Oct. 14, 2008

(54) METHOD FOR PRESENTING STREAMING MEDIA

(75) Inventors: Bernard Burg, Menlo Park, CA (US); Craig Sayers, Menlo Park, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 635 days.

This patent is subject to a terminal disclaimer.

(21) Appl. No.: 10/285,227

(22) Filed: Oct. 30, 2002

(65) Prior Publication Data

US 2004/0071214 A1    Apr. 15, 2004

Related U.S. Application Data

(63) Continuation of application No. 10/268,268, filed on Oct. 9, 2002.

(51) Int. Cl.
*H04N 7/12* (2006.01)
*H04N 11/02* (2006.01)
*H04N 11/04* (2006.01)
*H04B 1/66* (2006.01)

(52) U.S. Cl. .................................. 375/240.01
(58) Field of Classification Search ................. 375/240.03–240.08, 240.12–240.16, 240.2, 375/240.25; 725/110; *H04N 7/12*
See application file for complete search history.

(56) References Cited

U.S. PATENT DOCUMENTS

| | | | |
|---|---|---|---|
| 5,333,012 A * | 7/1994 | Singhal et al. | 375/240.04 |
| 6,937,770 B1 * | 8/2005 | Oguz et al. | 375/240.2 |
| 2002/0154699 A1 * | 10/2002 | Yamaguchi et al. | 375/240.25 |
| 2003/0058936 A1 * | 3/2003 | Peng et al. | 375/240.03 |
| 2003/0072370 A1 * | 4/2003 | Girod et al. | 375/240.13 |
| 2003/0142744 A1 * | 7/2003 | Wu et al. | 375/240.03 |
| 2004/0045030 A1 * | 3/2004 | Reynolds et al. | 725/110 |
| 2005/0117641 A1 * | 6/2005 | Xu et al. | 375/240.08 |
| 2005/0220192 A1 * | 10/2005 | Huang et al. | 375/240.25 |

* cited by examiner

*Primary Examiner*—Nhon T Diep (57) ABSTRACT

At least one data stream associated with an event is received. Compressing the data stream generates a first signal. A second signal is generated based on a difference between the data stream and the first signal. The second signal is compressed according to a measure of compression quality. The first signal and the second signal are transmitted.

23 Claims, 10 Drawing Sheets

METHOD FOR PRESENTING STREAMING MEDIA

CROSS REFERENCE TO RELATED APPLICATION

This Application is a Continuation-in-Part of the co-pending, commonly-owned U.S. patent application, Ser. No. 10/268,268, filed Oct. 9, 2002, by Bernard Burg and Craig Sayers, and entitled "A Method for Presenting Streaming Media for an Event."

FIELD OF INVENTION

Various embodiments of the present invention relate to the field of media presentation.

BACKGROUND OF THE INVENTION

Throughout history, live sporting events have provided entertainment to the masses. For thousands of years, the only way for a person to view and experience a live sporting event was to physically attend the event. With the advent of radio and television, it was possible to view the event live without being physically located at the event. As information technology has developed, new ways of presenting coverage of a live sporting event are possible.

In recent years, a new generation of portable electronic devices has been developed for receiving and presenting remote media content. For example, a personal digital assistant (PDA) or a portable computer (e.g., a laptop computer) may be configured to present streaming audio and/or video content. Often, due to their portability, these electronic devices receive the media content over a wireless connection. It has been proposed to provide media coverage of a live sporting event over a wireless connection to an electronic device.

For large scale sporting events, such as the Olympic games or a major league baseball game, it is reasonable to assume that a large number of high-resolution video feeds will be available to remote devices. Unfortunately, there are a number of problems associated with transmitting video to remote devices. For one, the bandwidth available to transmit video by a wireless connection to remote devices is limited. When a large number of users are receiving video content wirelessly, there may not be enough bandwidth to provide a full or high resolution image.

Furthermore, power consumption of an electronic device presenting streaming media is greater for a high resolution image (e.g., a high bandwidth signal) than for a low resolution image (e.g., a low bandwidth signal). Also, an electronic device having a small screen may not be able to present a full or high resolution image. As such, the extra bandwidth used to provide the high resolution image is wasted.

SUMMARY OF THE INVENTION

A method for presenting streaming media is presented. At least one data stream associated with an event is received. Compressing the data stream generates a first signal. A second signal is generated based on a difference between the data stream and the first signal. The second signal is compressed according to a measure of compression quality. The first signal and the second signal are transmitted.

BRIEF DESCRIPTION OF THE DRAWINGS

The accompanying drawings, which are incorporated in and form a part of this specification, illustrate embodiments of the invention and, together with the description, serve to explain the principles of the invention.

BEST MODE(S) FOR CARRYING OUT THE INVENTION

Reference will now be made in detail to various embodiments of the invention, examples of which are illustrated in the accompanying drawings. While the invention will be described in conjunction with various embodiments, it will be understood that they are not intended to limit the invention to these embodiments. On the contrary, the invention is intended to cover alternatives, modifications and equivalents, which may be included within the spirit and the scope of the invention as defined by the appended claims. Furthermore, in the following detailed description of the present invention, numerous specific details are set forth in order to provide a thorough understanding of the present invention. However, it will be apparent to one skilled in the art that the present invention may be practiced without these specific details. In other instances, well-known methods, procedures, components, structures and devices have not been described in detail so as to avoid unnecessarily obscuring aspects of the present invention.

Embodiments of the present invention provide a method and electronic device for presenting streaming media for an event, for example a sporting event. The present invention provides for intelligently adjusting a measure of compression quality to efficiently use the bandwidth available. By coupling knowledge of a specific event with sensor readings, embodiments of the present invention provide a higher measure of compression quality when something interesting is happening in an event and a lower measure of compression quality when something not as interesting is happening. Furthermore, embodiments of the present invention allow the viewer of a media stream to choose whether to watch live at low-quality, or to watch a slightly delayed, but higher-quality signal.

Figure 1A:
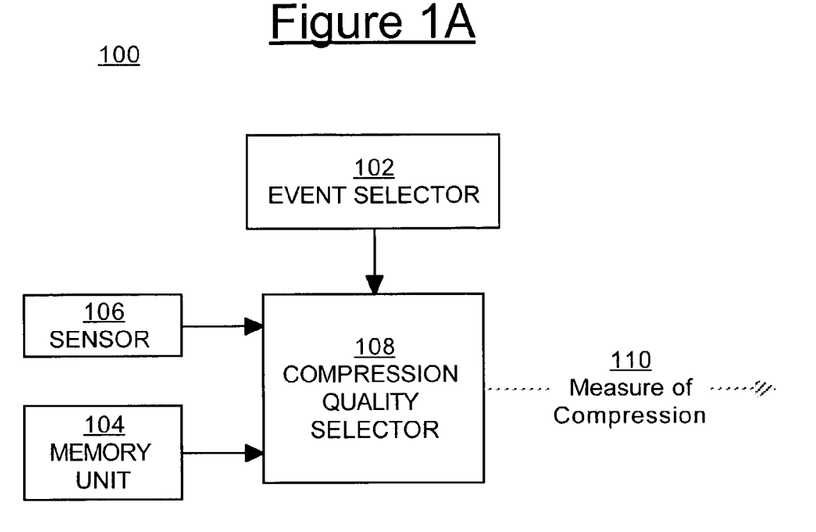
FIG. 1A is a block diagram of an exemplary electronic device for determining a measure of compression in accordance with one embodiment of the present invention.

FIG. 1A is a block diagram of an electronic device 100 for determining a measure of compression in accordance with one embodiment of the present invention. In one embodiment, electronic device 100 comprises event selector 102, memory unit 104, sensor 106 and compression quality selector 108. Event selector 102 is operable to receive an event selection from a user. In one embodiment, the event selection is made by a user operating a portable computer system communicatively coupled to electronic device 100 over a wireless connection. In response to the event selection, event selector 102 identifies event-specific information for the selected event.

Memory unit 104 has stored therein event-specific information for a plurality of events. It should be appreciated that the event-specific information for a particular event identifies the information required to adjust a measure of compression quality for streaming video. In one embodiment, the event-specific information comprises data stream information, compression quality information, and sensor information. The data stream information identifies at least one data stream associated with the event. In one embodiment, the data stream is a video data stream. For example, where the selected event is a long jump, a data stream transmitting video of the long jump is identified. Furthermore, where the selected event is likely to have multiple cameras capturing the action, such as the 5000 meters, a number of data streams transmitting video captured by the cameras is identified. The compression quality information identifies a measure of compression quality for the data stream associated with the event. The sensor information identifies at least one sensor associated with the event. It should be appreciated that memory unit 104 may comprise computer readable volatile memory (e.g., random access memory, static RAM, dynamic, RAM, etc.) for storing information and instructions for a processor and/or a computer readable non-volatile memory (e.g., read only memory, programmable ROM, flash memory, EPROM, EEPROM, etc.) for storing static information and instructions for a processor.

In one embodiment, compression quality selector 108 receives the event selection from selector 102. In response to the event selection, the associated event-specific information is accessed from memory unit 104. As described above, the event-specific information comprises data stream information, compression quality information, and sensor information. In one embodiment, the sensor information identifies a sensor 106 to be used for sensor readings. It should be appreciated that embodiments of the present invention may comprise more than one sensor.

When transmitting a media stream, there is a tradeoff between the fidelity of the stream and the bandwidth needed to transmit it. Since bandwidth is usually a limited resource, it is common to use a lossy compression scheme; deliberately choosing not to transmit all the information in order to save bandwidth. In one embodiment, a lossy compression scheme is to transmit only every second pixel from an image, or only every other frame from a video. More complex compression schemes attempt to remove that portion of the information that is least perceptible to a human.

The compression quality is a measure of the amount of information that is discarded as the media stream is compressed. When the compression quality is very high, little information is lost and the transmitted stream is perceived by humans to be identical to an uncompressed stream. When compression quality is very low, so much information is discarded that the resulting stream is noticeably inferior to the original. For example, it may be blurry, or jerky, or have visible artifacts. Persons familiar with the state of the art in compression technology will be aware of a number of algorithms for varying the amount of data in response to a desired quality setting.

Figure 2A:
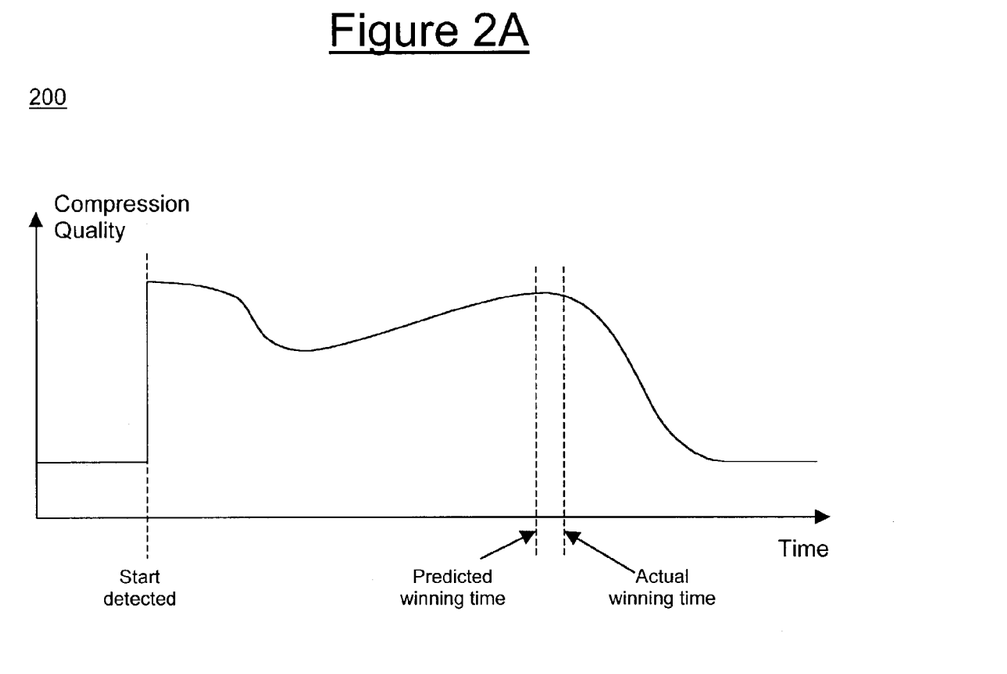
FIGS. 2A and 2B are graphical diagrams of exemplary compression quality information in accordance with one embodiment of the present invention.
Figure 2B:
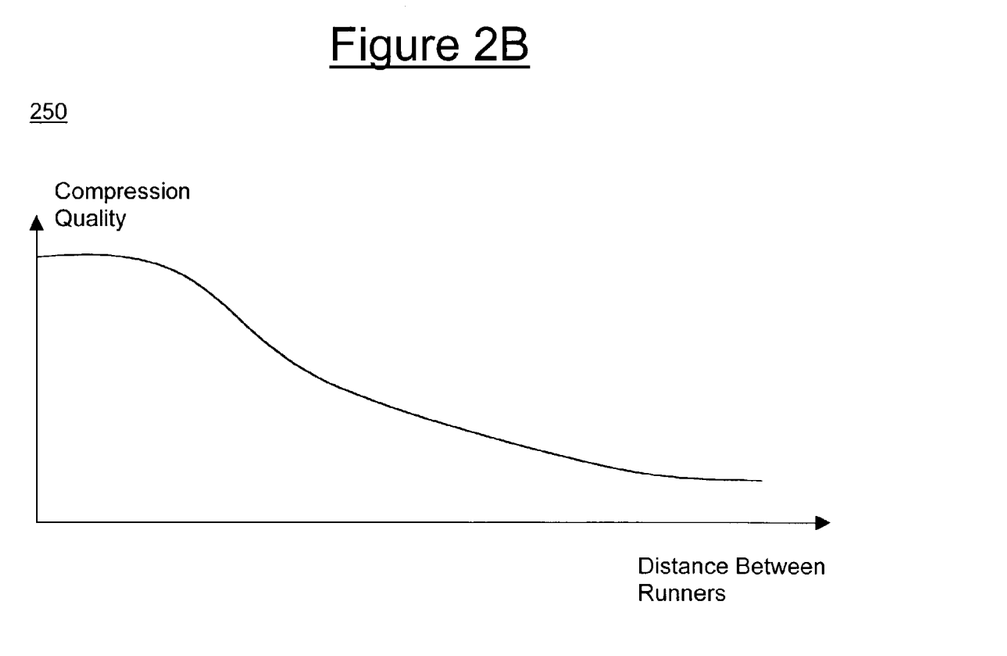

Compression quality selector 108 determines a measure of compression quality 110 based on the sensor reading and the compression quality information. FIGS. 2A and 2B are graphical diagrams of exemplary compression quality information in accordance with one embodiment of the present invention. Compression quality information 200 of FIG. 2A illustrates an example where the measure of compression quality is adjusted according to the time of the event. Because the characteristics of an event are generally known, in certain situations, it is possible to ascertain the important moments in time for an event. For example, consider a race such as the 1500 meters race. Since the 1500 meters is a common event, it is well known among race officials what the approximate finish time for the winner will be, usually within a few seconds.

Generally, the most important or exciting times for a spectator are at the start of the race and at the approach to the finish line. The middle portion of the race may not be considered as important or exciting. Compression quality information 200 illustrates such an example. Prior to the start of the race, nothing is happening, so the measure of compression quality is low. A sensor (e.g., sensor 106 of FIG. 1) is used to detect the start of the race. For example, the sensor may detect the starting gun or may be coupled to the official race timekeeper. When the start is detected, the measure of compression quality increases to produce a high quality video stream. As the race continues, the measure of compression quality tapers down towards the middle of the race, and then picks up as the predicted winning time nears. Because the characteristics of events that base winning on a measure of time are known, the predicted winning time will probably be very close to the actual winning time. Thus, the measure of compression quality at any time can be determined.

There are many other ways to implicitly determine an important or exciting moment in a live event. For example, in a long distance running race, there may be exciting moments apart from just the beginning and end of the race. A spectator may find it exciting when one runner is trying to pass another runner, or a number of runners are clumped together. Compression quality information 250 of FIG. 2B illustrates an example where the measure of compression quality is adjusted according to the distance between competing runners. A sensor (e.g., sensor 106 of FIG. 1) is used to detect the runners. For example, the runners may have electronic ID tags sewn within the seams of their clothing or in their running shoes. Also, a camera or a group of cameras may be used to detect the runners and the distance between them. It should be appreciated that there are a large number of methods for detecting runners and their respective positions commonly known in the art. Compression quality information 250 provides a higher measure of compression quality when the runners are closer together. The measure of compression quality decreases as the distance between the runners increases.

It should be appreciated that any number and combination of sensors and compression quality information can be used to automate the measure of compression quality. For example, the measure of compression quality can be based on a level of sound detected at the event. Implicitly, as crowd noise increases the excitement increases. Alternatively, the measure of compression quality can be based on a level of sound from commentators broadcasting the event. Also, the measure of compression quality can be based on a location of the event where sudden changes are likely to occur. For example, consider an automobile race with a sharp turn or an oil spill that is likely to cause an accident. The measure of compression quality may be controlled by any combination of sensors and compression quality information, and is not limited the embodiments as described in the present invention.

Figure 3A:
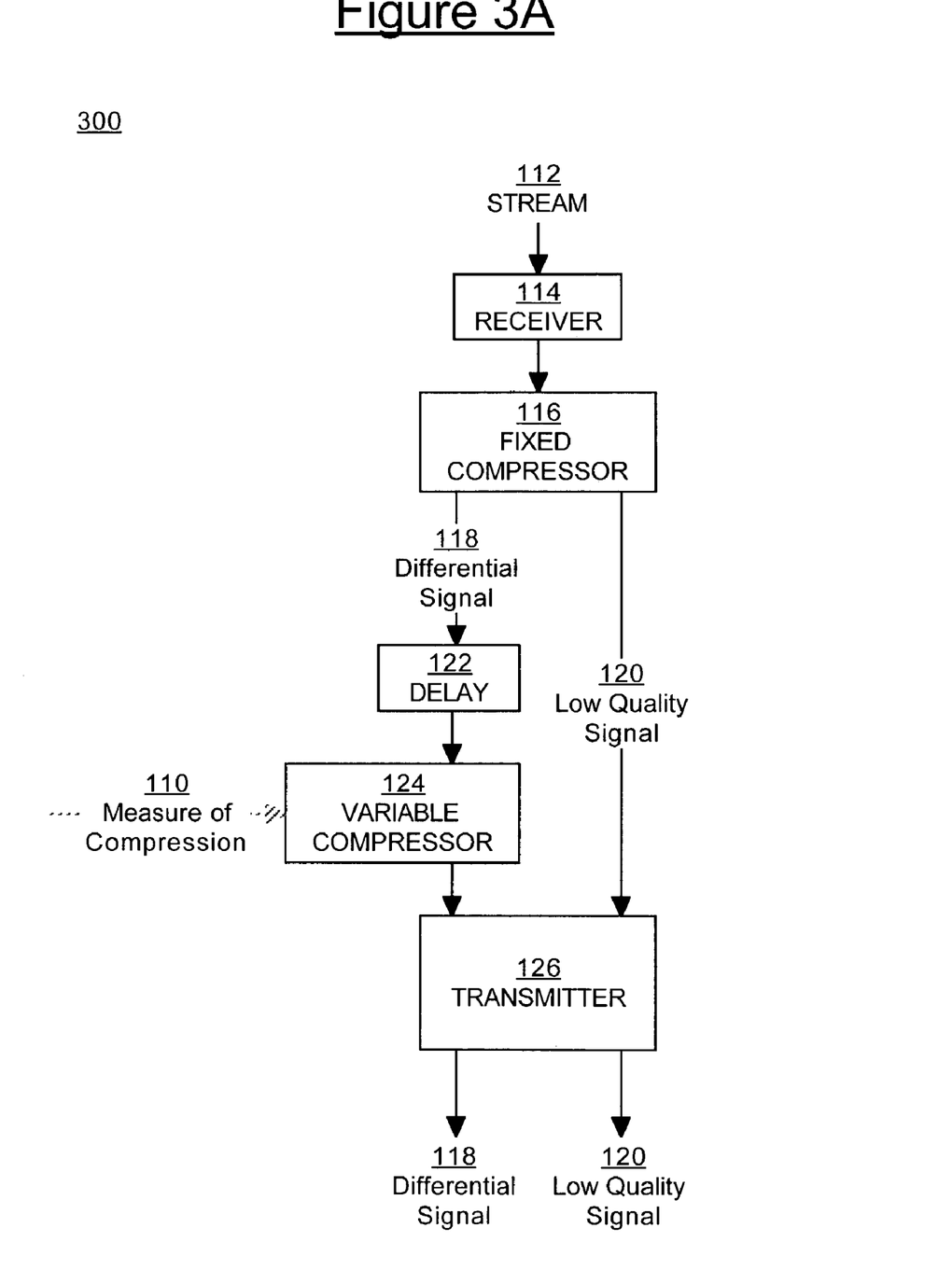
FIG. 3A is a block diagram of an exemplary electronic device for presenting streaming media in accordance with one embodiment of the present invention.

FIG. 3A is a block diagram of electronic device 300 for presenting streaming media in accordance with one embodiment of the present invention. In one embodiment, electronic device comprises receiver 114, fixed compressor 116, variable compressor 124, and transmitter 126. Receiver 114 is operable to receive a data stream 112 of the event. In one embodiment, data stream 112 is a video stream. Data stream 112 is transmitted to fixed compressor 116. In one embodiment, fixed compressor 116 generates a low quality signal 120 (e.g., a first signal) by compressing data stream 112 and a differential signal 118 (e.g., a second signal) based on the difference between low quality signal 120 and data stream 112. Differential signal 118 captures the information that was removed from 112 data stream as it was compressed to generate low quality signal 120. In one embodiment, information is in the spatial domain, and is equivalent to what would be obtained by decompressing the low-quality compressed stream and subtracting it from the original data stream. It should be appreciated that other forms of differential signals may be used.

Low quality signal 120 is then transmitted to transmitter 126. In one embodiment, transmitter 126 transmits the low quality signal 120 to a client device by a wireless connection. Differential signal 118 is transmitted to delay device 122 where it is delayed by a predetermined time. Delayed differential signal 118 is transmitted to variable compressor 124. Variable compressor 124 compresses differential signal 118 according to measure of compression 110 as determined at compression quality selector 108 of FIG. 1. The compressed differential signal 118 is then transmitted to transmitter 126. In one embodiment, transmitter 126 transmits differential signal 118 to a client device by a wireless connection. It should be appreciated that, due to the use of delay device 122, the compression quality for the differential signal is adjusted retroactively. For example, if a runner falls, and the crowd gasps in response to the fall, the gasp will be detected and used to alter the compression quality before the differential signal corresponding to the time of that incident reaches the variable compressor.

Figure 1B:
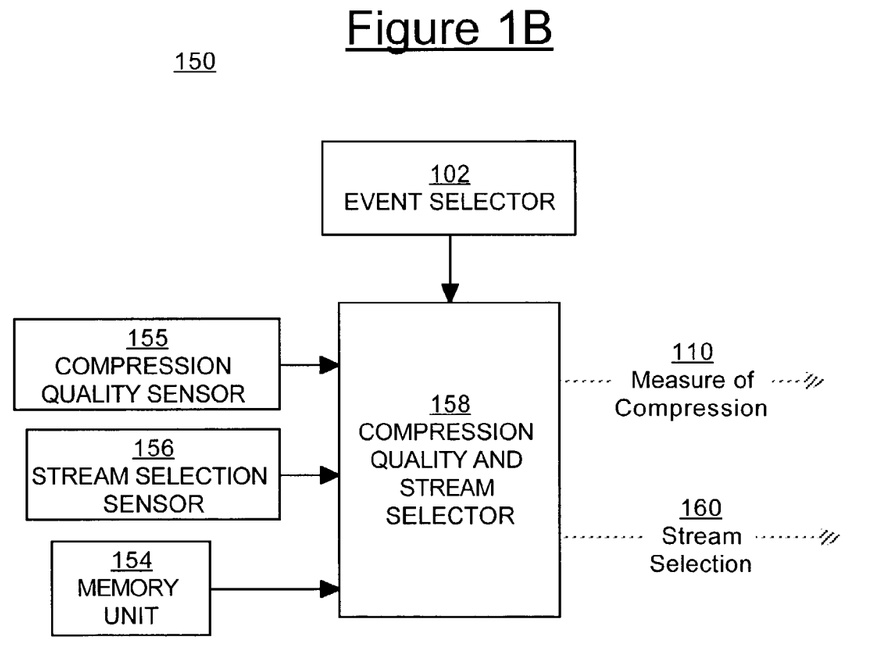
FIG. 1B is a block diagram of an exemplary electronic device for determining a measure of compression and a stream selection in accordance with one embodiment of the present invention.

Embodiments of the present invention provide a device and method for automatically selecting a video stream from a plurality of video streams and adjusting the measure of compression quality of the selected stream. The selected stream may then be transmitted to electronic devices for viewing. FIG. 1B is a block diagram of an exemplary electronic device for determining a measure of compression and a stream selection in accordance with one embodiment of the present invention.

In one embodiment, electronic device 150 comprises event selector 102, memory unit 154, first sensor 155, second sensor 156 and compression quality and stream selector 158. Event selector 102 is operable to receive an event selection from a user, and operates similar to event selector 102 of FIG. 1A. In one embodiment, the event selection is made by a user operating a client device communicatively coupled to electronic device 150 over a wireless connection. In response to the event selection, event selector 102 identifies event-specific information for the selected event.

Memory unit 154 has stored therein event-specific information for a plurality of events, and operates similar to memory unit 104 of FIG. 1. It should be appreciated that, in accordance with the present embodiment, the event-specific information for a particular event identifies the information required to select the appropriate video stream from a plurality of video streams, and to adjust a measure of compression quality for the selected video stream.

In one embodiment, the event-specific information comprises data stream information, data stream selection information, compression quality information, and sensor information. In the present embodiment, multiple data streams are received, such that the data stream information identifies a plurality of data streams associated with the event. The data stream selection information identifies at least one criterion for selecting a data stream from a plurality of data streams. The compression quality information identifies a measure of compression quality for the data stream associated with the event, as described above. The sensor information identifies at least one stream selection sensor associated with the event for selecting a data stream from the plurality of data streams and at least one compression quality sensor associated with the event for adjusting the measure of compression quality for the selected data stream. It should be appreciated that memory unit 154 may comprise computer readable volatile memory (e.g., random access memory, static RAM, dynamic, RAM, etc.) for storing information and instructions for a processor and/or a computer readable non-volatile memory (e.g., read only memory, programmable ROM, flash memory, EPROM, EEPROM, etc.) for storing static information and instructions for a processor.

In one embodiment, compression quality and stream selector 158 receives the event selection from selector 102. In response to the event selection, the associated event-specific information is accessed from memory unit 154. In one embodiment, the sensor information identifies compression quality sensor 155 and stream selection sensor 156 to be used for sensor readings. It should be appreciated that embodiments of the present invention may comprise more than one compression quality sensor and/or more than one stream selection sensor.

In order to provide the appropriate stream for transmission, embodiments of the present invention provide for automatically selecting the appropriate stream. In accordance with embodiments of the present invention, compression quality and stream selector 158 selects one data stream for presentation based on the stream selection sensor reading and the data stream selection information. In one embodiment, the data stream selection information identifies at least one criterion for evaluating each data stream. The criterion is obtained by receiving data from stream selection sensor 156. In one embodiment, a fragment (e.g., an individual frame) of each data stream is scored. The score is based on the criterion.

It should be appreciated that the criterion used for evaluating each data stream can be selected by a user operating a portable electronic device. In one embodiment, a user receiving transmission of a the video stream may select their desired criterion an input the selection such that it is received at event selector 102. For example, a user receiving a transmission of a race may desire to watch a particular runner. Stream selection sensor 156 (e.g., a camera or an electronic ID tag) detects the selected runner. Each stream is given a score based on the inclusion of the desired runner and other factors, such as image clarity. The stream with the highest score is selected for transmission to the portable electronic device of the user.

In another embodiment, the stream currently visible on a camera for display on a live television broadcast is displayed. For example, if something unexpected were to happen in a race, such as two runners tripping over each other, the live television feed may not react immediately, and would probably switch to the incident after it had happened. By delaying the video streams by a predetermined time (e.g., a few seconds), the selected stream would be switched to the stream showing the incident before it happens. Thus, the selected stream transmitted to a portable electronic device would show the unexpected incident in full, and not merely the aftermath.

It should be appreciated that any number of criteria can be used to score and select a data stream. For example, a stream with the lead runner may receive the highest score. Before the start of the race the starting line may receive the highest score. Near the expected end of the race, the finish line may be shown. Any objective criteria can be used to select a data stream from a plurality of data streams. It should be appreciated that criteria can vary from event to event and user to user. Once a stream is selected, stream selection 160 identifying the selected stream is transmitted to stream switch 316 of electronic device 350 of FIG. 3B.

Figure 3B:
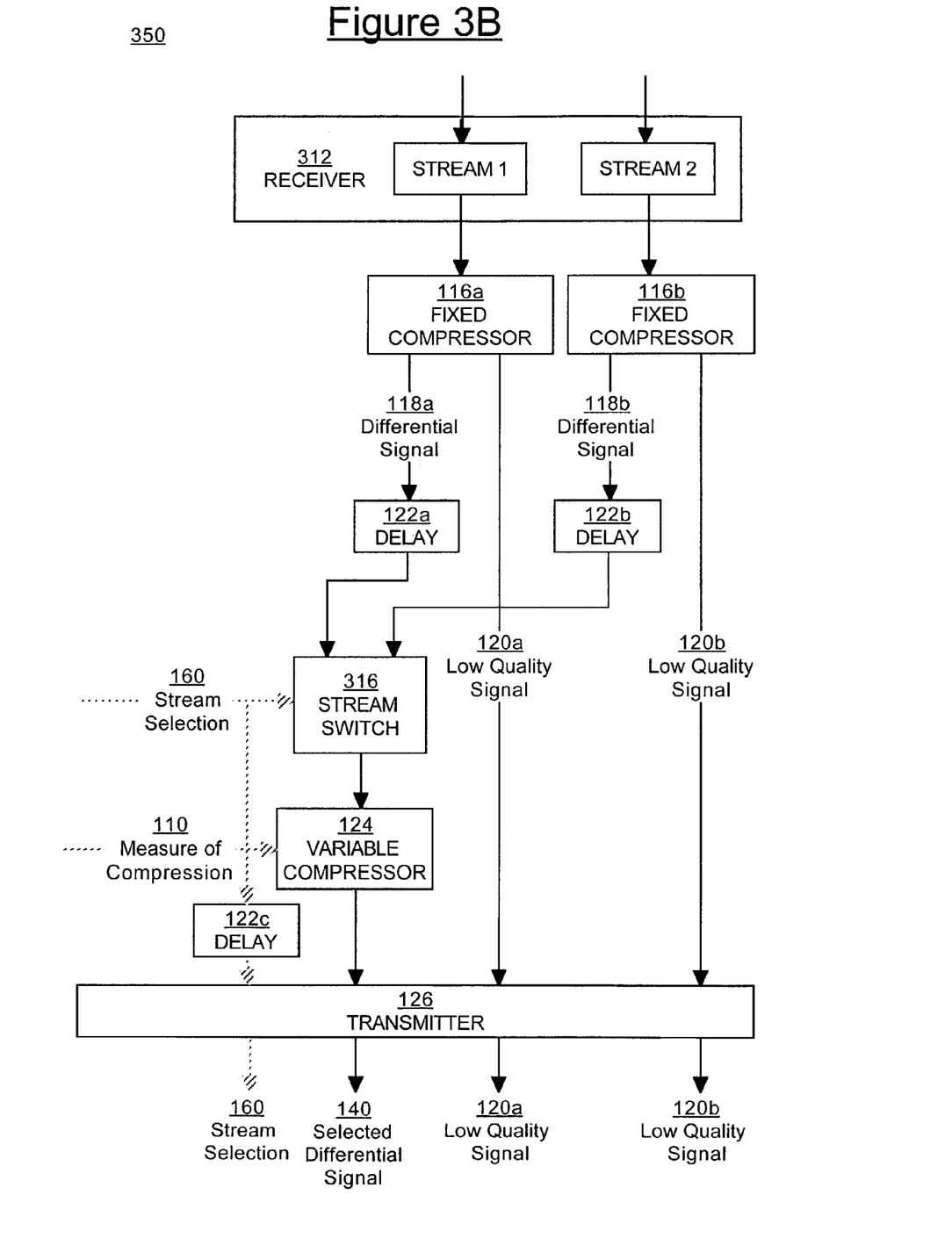
FIG. 3B is a block diagram of an exemplary electronic device for presenting streaming media in accordance with another embodiment of the present invention.

FIG. 3B is a block diagram of electronic device 350 for presenting streaming media in accordance with one embodiment of the present invention. In one embodiment, electronic device 350 comprises a plurality of electronic devices 300 of FIG. 3A, wherein each incoming data stream is received at a distinct electronic device 300. The low quality streams 120 are all transmitted, while only one differential signal 118 for generating a high quality signal is transmitted. At the receiver (e.g., electronic device 450 of FIG. 4B) a user can select to watch any low quality signal 120, which are rendered live, or a high quality signal as selected by electronic device 350.

In one embodiment, electronic device 350 comprises receiver 312, a plurality of fixed compressors 116 (e.g., fixed compressors 116a and b), a plurality of delay devices 122 (e.g., delay devices 122a-c), stream switch 316, variable compressor 124, and transmitter 126. Receiver 312 is operable to receive a plurality of data streams (e.g., streams 1 and 2 of FIG. 3B). In one embodiment, the data streams are video data streams. It should be appreciated that receiver 312 may receive any number of data streams, and is not limited to the present embodiment as illustrated in FIG. 3.

In one embodiment, each data stream is forwarded to a corresponding fixed compressor 116 (e.g., fixed compressors 116a and b). In one embodiment, fixed compressor 116 generates a low quality signal 120 (e.g., a first signal) by compressing data stream 112 and a differential signal 118 (e.g., a second signal) based on the difference between low quality signal 120 and data stream 112. Differential signal 118 captures the information that was removed from 112 data stream as it was compressed to generate low quality signal 120. In one embodiment, information is in the spatial domain, and is equivalent to what would be obtained by decompressing the low-quality compressed stream and subtracting it from the original data stream. It should be appreciated that other forms of differential signals may be used. As described above, one low quality signal 120 (e.g., low quality signals 120a and b) and one differential signal 118 (e.g., differential signals 118a and b) is generated for each data stream received.

Low quality signals 120 are forwarded to transmitter 126 for transmission. In one embodiment, differential signals 118 are delayed by a predetermined time at delay devices 122. It should be appreciated that there can be any number of delay devices 122 (e.g., delay device 314a and b of FIG. 3B), and is not limited to the present embodiment. Furthermore, one delay device may delay any number of data streams, and is not limited to delaying only one data stream. As such, embodiments of the present invention may comprise any number of delay devices.

The delayed differential signals 118 are received at stream switch 316. Stream switch 316 is operable to select one differential signal 118 of the plurality of differential signals 118 based on stream selection 160 as determined at compression quality and stream selector 158 of FIG. 1B. Based on stream selection 160, in one embodiment, selected differential signal 140 is selected from differential signals 118. Selected differential signal 140 is forwarded to variable compressor 124. Stream selection 160 is also received at a delay device 122 (e.g., delay device 122c), where it is delayed by a predetermined time. The delayed stream selection 160 is then forwarded to transmitter 126.

With reference to FIG. 1B, compression quality and stream selector 158 also determines a measure of compression quality based on the compression quality sensor reading and the compression quality information. It should be appreciated the compression quality and stream selector 158 determines the measure of compression quality in a similar manner as compression quality selector 108 of FIG. 1A, as described above. Furthermore, as described above, FIGS. 2A and 2B illustrate exemplary compression quality information in accordance with embodiments of the present invention. Once determined, measure of compression quality 110 is transmitted to variable compressor 124 of FIG. 3B.

Figure 4A:
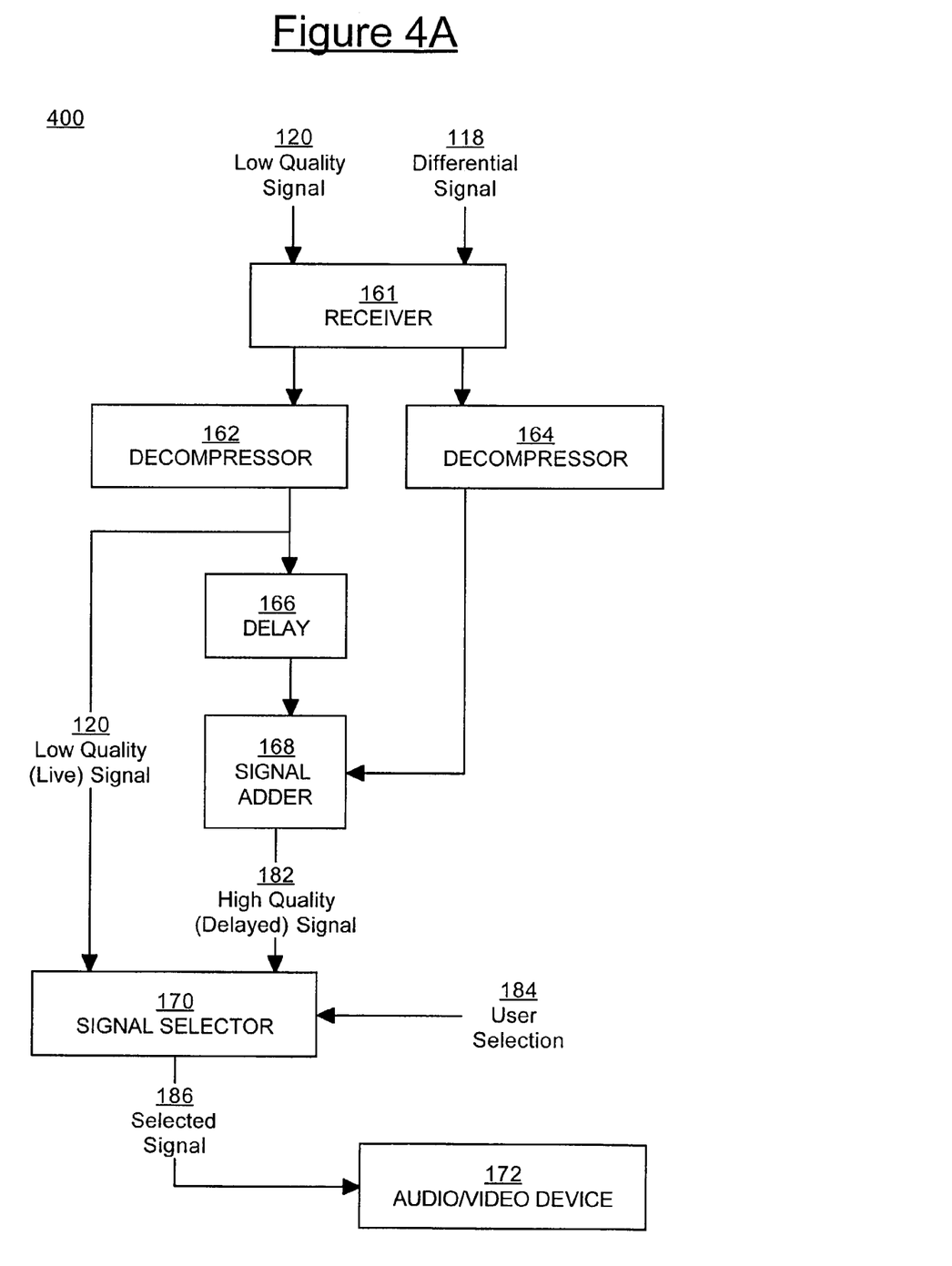
FIG. 4A is a block diagram of an exemplary client device in accordance with one embodiment of the present invention.

Low quality signals 120 are received at transmitter 126. In one embodiment, transmitter 126 transmits low quality signals 120 to a client device by a wireless connection. Selected differential signal 140 is received at variable compressor 124. Variable compressor 124 compresses selected differential signal 140 according to measure of compression 110 as determined at compression quality selector 108 of FIG. 1B. The compressed selected differential signal 140 is then transmitted to transmitter 126. In one embodiment, transmitter 126 transmits selected differential signal 140 to a client device by a wireless connection. Similarly, transmitter 126 transmits stream selection 160 to a client device by a wireless connection FIG. 4A is a block diagram of an exemplary client device 400 in accordance with one embodiment of the present invention. In one embodiment, client device 400 is a portable electronic device. In one embodiment, electronic device 400 comprises receiver 161, signal adder 168, signal selector 170, and audio/video device 172. Receiver 161 is operable to receive low quality signal 120 and differential signal 118 (e.g., low quality signal 120 and differential signal 118 of FIG. 3A). In one embodiment, low quality signal 120 and differential signal 118 are received over a wireless connection.

In one embodiment, electronic device 400 comprises decompressor 162 for decompressing low quality signal 120 and decompressor 164 for decompressing differential signal 118. Differential signal 118 is forwarded to signal adder 168. In one embodiment, low quality signal 120 is split such that it is forwarded to both signal selector 170 and delay device 166. At delay device 166, low quality signal 120 is delayed by a predetermined time. In one embodiment, the predetermined time is the same predetermined time as delay device 122 of FIG. 3A. At signal adder 168, low quality signal 120 is added to differential signal 118, resulting in high quality signal 182. In one embodiment, client device 400 is appropriate for the case where differential signal 118 is in the spatial domain wherein simple addition of low quality signal 120 and differential signal 118 to create high quality signal 182. In another embodiment, where differential signal 118 is not in the spatial domain, low quality signal 120 may be delayed and supplied along with differential signal 118 to a single sophisticated decompressor capable of combining them to generate high quality signal 182. It should be appreciated that the addition of low quality signal 120 and differential signal 118 can be accomplished in any manner known in the art. In one embodiment, low quality signal 120 is added to differential signal 118 using the inverse of the technique used by fixed compressor 116 of FIG. 3A to generate quality signal 120 and differential signal 118. High quality signal 182 is forwarded to signal selector 170.

In one embodiment, signal selector 170 receives user selection 184. User selection 184 indicates which signal of low quality signal 120 and high quality signal 182 are to be rendered by electronic device 400. Low quality signal 120 is rendered live because no delay devices are used to delay low quality signal 120. Alternatively, high quality signal 182 is delayed due to the use of delay device 122 of FIG. 3A and delay device 166. Selected signal 186 is forwarded to audio/video device 172 for rendering. It should be appreciated that audio/video device 172 can be any device used to render audio and/or video (e.g., a display screen and speakers).

Figure 4B:
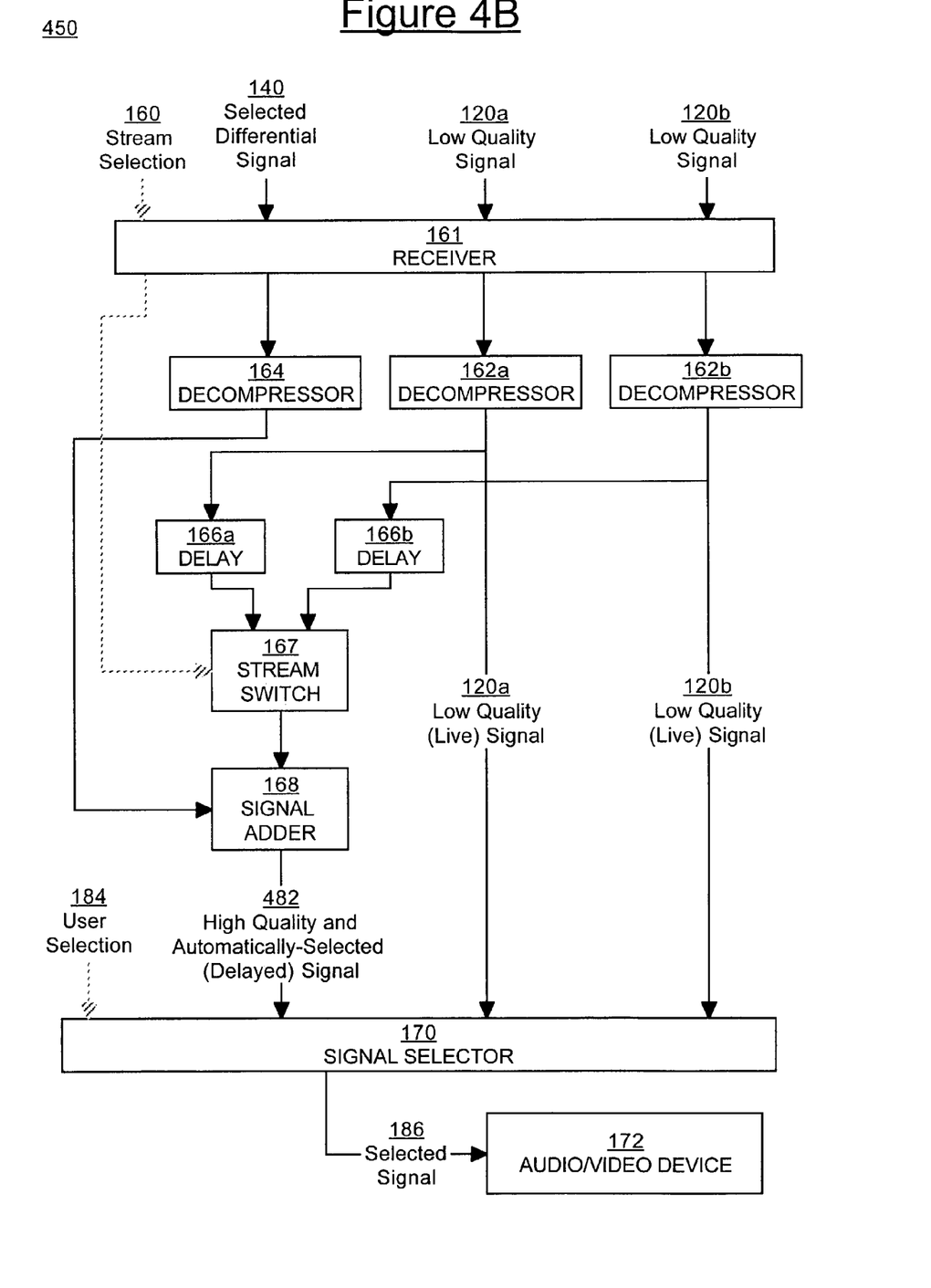
FIG. 4B is a block diagram of an exemplary client device in accordance with another embodiment of the present invention.

FIG. 4B is a block diagram of an exemplary client device 450 in accordance with another embodiment of the present invention. In one embodiment, client device 450 is a portable electronic device. In one embodiment, electronic device 450 comprises receiver 161, stream switch 167, signal adder 168, signal selector 170, and audio/video device 172. Receiver 161 is operable to receive a plurality of low quality signals 120 (e.g., low quality signals 120a and b of FIG. 3B), selected differential signal 140 (e.g., selected differential signal 140 of FIG. 3B), and stream selection 160 (e.g., stream selection 160 of FIG. 3B). In one embodiment, low quality signals 120, selected differential signal 140 and stream selection 160 are received over a wireless connection.

In one embodiment, electronic device 450 comprises a plurality of decompressors 162 (e.g., decompressors 162a and b) for decompressing low quality signals 120 and decompressor 164 for decompressing selected differential signal 140. Selected differential signal 140 is forwarded to signal adder 168. In one embodiment, each low quality signal 120 is forwarded to a corresponding delay device 166 (e.g., delay device 166a and b). At delay device 166, low quality signal 120 is delayed by a predetermined time. In one embodiment, the predetermined time is the same predetermined time as delay device 122 of FIG. 3B. Each delayed low quality signal 120 is received at stream switch 167. Stream switch 167 is operable to select one low quality signal 120 of the plurality of low quality signal 120 based on stream selection 160 as determined at compression quality and stream selector 158 of FIG. 1B.

At signal adder 168, the selected low quality signal 120 is added to selected differential signal 140, resulting in high quality signal 482. It should be appreciated that high quality signal 482 is automatically selected according to stream selection 160, and is delayed by the predetermined time. In one embodiment, client device 450 is appropriate for the case where selected differential signal 140 is in the spatial domain wherein simple addition of low quality signal 120 and selected differential signal 140 to create high quality signal 182. In another embodiment, where selected differential signal 140 is not in the spatial domain, low quality signal 120 may be delayed and supplied along with selected differential signal 140 to a single sophisticated decompressor capable of combining them to generate high quality signal 482. It should be appreciated that the addition of low quality signal 120 and selected differential signal 140 can be accomplished in any manner known in the art. In one embodiment, low quality signal 120 is added to selected differential signal 140 using the inverse of the technique used by fixed compressor 116 of FIG. 3B to generate quality signal 120 and differential signal 118. High quality signal 482 is forwarded to signal selector 170.

In one embodiment, signal selector 170 receives user selection 184. User selection 184 indicates which signal of the plurality of low quality signals 120 and high quality signal 482 are to be rendered by electronic device 400. Low quality signal 120 is rendered live because no delay devices are used to delay low quality signal 120. Alternatively, high quality signal 482 is delayed due to the use of delay device 122 of FIG. 3B and delay device 166. High quality signal 482 or any low quality signal 120 may be selected. Selected signal 186 is forwarded to audio/video device 172 for rendering. It should be appreciated that audio/video device 172 can be any device used to render audio and/or video (e.g., a display screen and speakers).

FIGS. 4A and 4B illustrate embodiments with one or two data streams. As described above, it should be appreciated that similar implementations apply for arbitrary numbers of streams. If the number of streams were variable, then an additional piece of information could be transmitted to indicate the number of available channels. It should also be apparent that just as the system may have an arbitrary number of low-quality streams, it may also have an arbitrary number of high-quality streams. For example, if there were 10 video signals, the system could send a low-quality version of each, and a high-quality version of the best three. In that case the user of the client device could choose to watch any of the streams live with low quality, or any one of the three high-quality delayed streams.

In one embodiment, it would be beneficial to encode some information from the sensors (e.g., stream selection sensor 156 of FIG. 1B) within the transmitted streams so that the client device may use that information to automatically select one of the received signals for display. In making that choice, it could apply similar algorithms to those used to create the corresponding signal, (e.g., selection signal 160), but also incorporate additional user-specific preferences.

Figure 5:
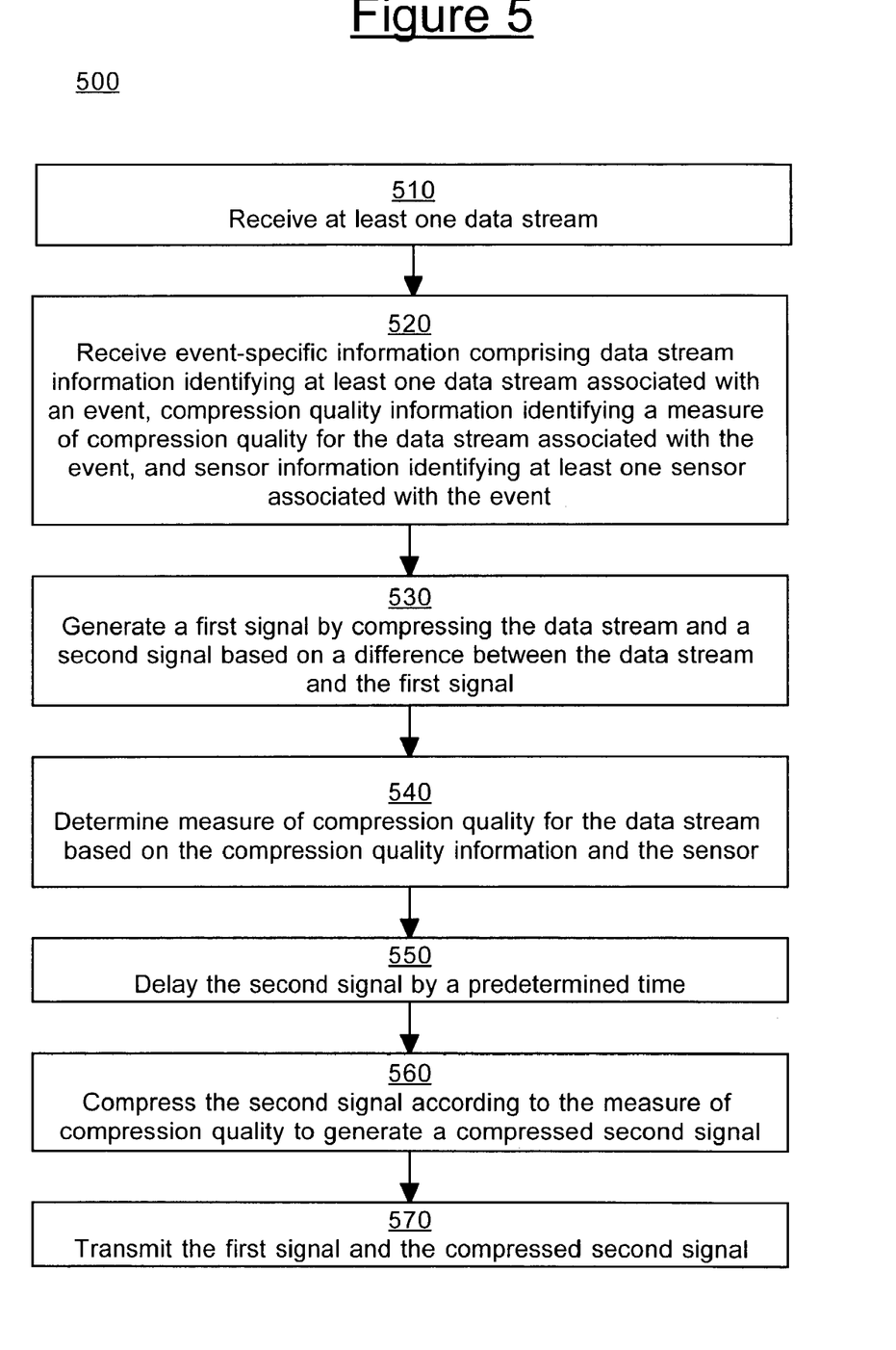
FIG. 5 is a flow chart of a process for presenting streaming media in accordance with one embodiment of the present invention.

FIG. 5 is a flow chart of a process 500 for presenting streaming media in accordance with one embodiment of the present invention. In one embodiment, process 500 is carried out by processors and electrical components under the control of computer readable and computer executable instructions. Although specific steps are disclosed in process 500, such steps are exemplary. That is, the embodiments of the present invention are well suited to performing various other steps or variations of the steps recited in FIG. 5.

At step 510 of process 500, at least one data stream is received at an electronic device (e.g., electronic device 300 of FIG. 3A). In one embodiment, the data stream is a video stream of a live event. At step 520, event-specific information for the event is received at an electronic device. In one embodiment, the event-specific information is received in response to a user request. The event-specific information is based on an event selection made by a user operating a portable computer system communicatively coupled to an electronic device over a wireless connection. In response to the event selection, event-specific information is identified for the selected event. It should be appreciated that the event-specific information for a particular event identifies the information required to adjust a measure of compression quality for streaming video.

In one embodiment, the event-specific information comprises data stream information, compression quality information, and sensor information, as described above. In one embodiment, the data stream information identifies at least one data stream associated with the event, the compression quality information identifies a measure of compression quality for the data stream associated with the event, and the sensor information identifies at least one sensor (e.g., sensor 106 of FIG. 1A) associated with the event. In one embodiment, the data stream is a video data stream. It should be appreciated that the event-specific information may reside within computer readable volatile memory of the electronic device (e.g., memory unit 104 of FIG. 1A).

At step 530, a first signal is generated by compressing the data stream and a second signal is generated based on the difference between the data stream and the first signal. In one embodiment, the first signal is a low quality signal and the second signal is a differential signal comprising incremental improvements of the low quality signal. The second signal captures the information that was removed from the data stream as it was compressed to generate the first signal. In one embodiment, information is in the spatial domain, and is equivalent to what would be obtained by decompressing the low quality compressed signal and subtracting it from the original data stream. It should be appreciated that other forms of differential signals may be used. In one embodiment, the first signal and second signal are generated at a fixed compressor (e.g., fixed compressor 124 of FIG. 3A).

At step 540, a compression quality signal is generated for the second signal is determined based on the compression quality information and the sensor. In one embodiment, the measure of compression quality defines a video resolution of the second signal. In one embodiment, the measure of compression quality is determined by a compression quality selector of the electronic device (e.g., compression quality selector 108 of FIG. 1A).

At step 550, the second signal is delayed by a predetermined time. In one embodiment, the second signal is delayed a few seconds (e.g., 1-5 seconds). In one embodiment, the second signal is delayed by a delay device (e.g., delay device 122 of FIG. 3A). It should be appreciated that step 550 is optional.

At step 560, the second signal is compressed according to the measure of compression quality, generating a compressed second signal. In one embodiment, the second signal is received at a variable compressor of the electronic device (e.g., variable compressor 124 of FIG. 3A). The variable compressor operates to compress the second signal according to the compression quality signal as received from the compression quality selector.

At step 570, the first signal and the compressed second signal are transmitted by a transmitter of the electronic device (e.g., transmitter 126 of FIG. 3A). In one embodiment, the first signal and the compressed second signal are transmitted by a wireless connection to a client device.

Figure 6:
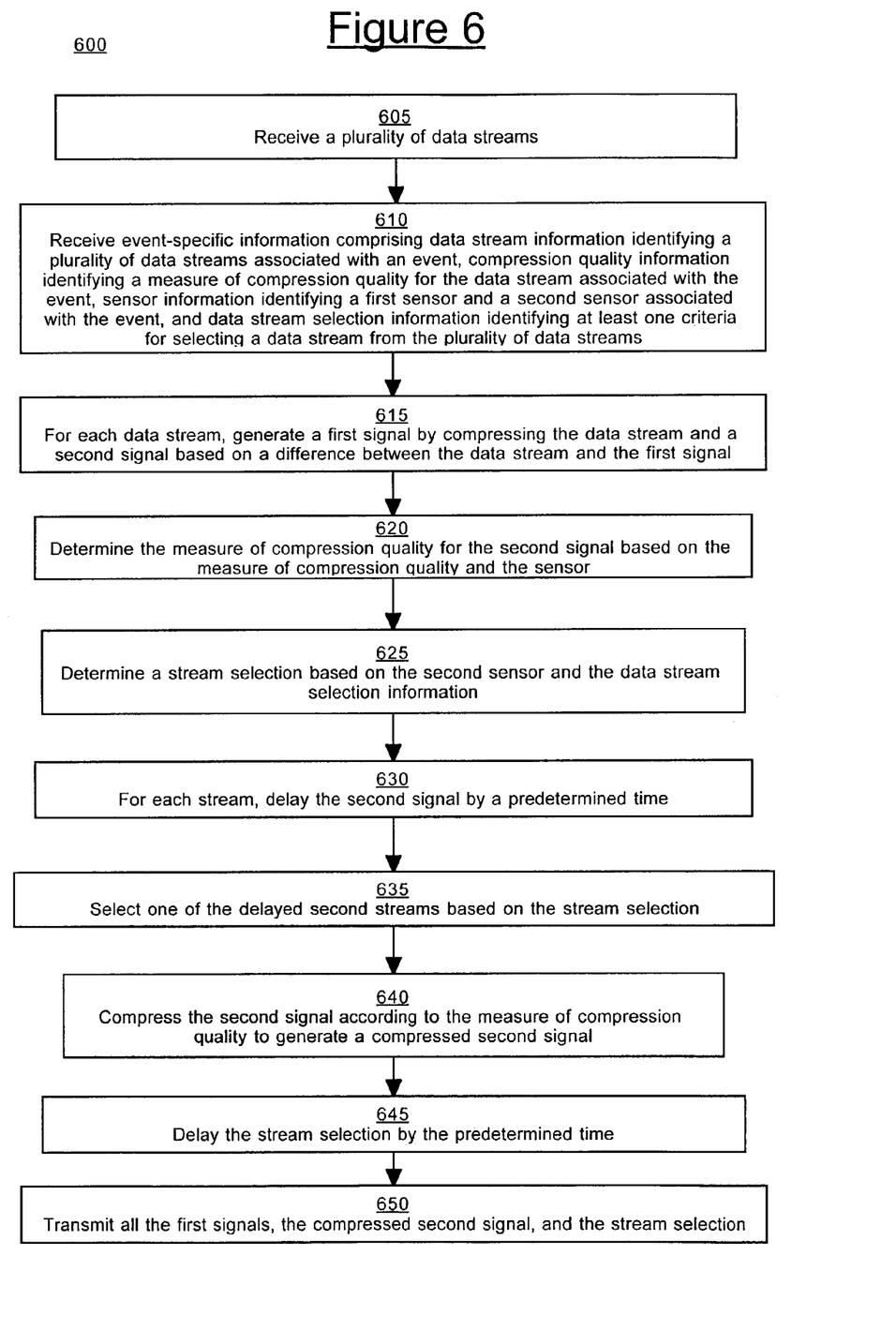
FIG. 6 is a flow chart of a process for presenting streaming media in accordance with another embodiment of the present invention.

FIG. 6 is a flow chart of a process for presenting streaming media in accordance with another embodiment of the present invention. In one embodiment, process 600 is carried out by processors and electrical components under the control of computer readable and computer executable instructions. Although specific steps are disclosed in process 600, such steps are exemplary. That is, the embodiments of the present invention are well suited to performing various other steps or variations of the steps recited in FIG. 6.

At step 605 of process 600, a plurality of data streams are received at an electronic device (e.g., electronic device 350 of FIG. 3B). In one embodiment, the data streams are video streams of a live event. At step 610, event-specific information for the event is received. In one embodiment, the event-specific information is received in response to a user request. The event-specific information is based on an event selection made by a user operating a portable computer system communicatively coupled to an electronic device over a wireless connection. In response to the event selection, event-specific information is identified for the selected event. It should be appreciated that the event-specific information for a particular event identifies the information required to adjust a measure of compression quality for streaming video.

In one embodiment, the event-specific information comprises data stream information, data stream selection information, compression quality information, and sensor information. In the present embodiment, multiple data streams (e.g., streams 1-n of FIG. 3B) are received, such that the data stream information identifies a plurality of data streams associated with the event. The data stream selection information identifies at least one criterion for selecting a data stream from a plurality of data streams. The compression quality information identifies a measure of compression quality for the data stream associated with the event, as described above. The sensor information identifies at least one stream selection sensor (e.g., stream selection sensor 156 of FIG. 1B) associated with the event for selecting a data stream from the plurality of data streams and at least one compression quality sensor (e.g., compression quality sensor 155 of FIG. 1 B) associated with the event for adjusting the measure of compression quality for the selected data stream. It should be appreciated that the event-specific information may reside within computer readable volatile memory of the electronic device (e.g., memory unit 154 of FIG. 1 B).

At step 615, for each data stream received, a first signal is generated by compressing the selected data stream and a second signal is generated based on the difference between the selected data stream and the first signal. In one embodiment, the first signal is a low quality signal and the second signal is a differential signal comprising incremental improvements of the low quality signal. The second signal captures the information that was removed from the data stream as it was compressed to generate the first signal. In one embodiment, information is in the spatial domain, and is equivalent to what would be obtained by decompressing the low quality compressed signal and subtracting it from the original data stream. It should be appreciated that other forms of differential signals may be used. In one embodiment, the first signal and second signal are generated at a fixed compressor (e.g., fixed compressor 124 of FIG. 3B).

At step 620, the measure of compression quality for the second signal is determined based on the compression quality information and the compression quality sensor (e.g., first sensor). In one embodiment, the measure of compression quality defines a video resolution of the second signal. In one embodiment, the measure of compression quality is determined by a compression quality selector of the electronic device (e.g., compression quality and stream selector 158 of FIG. 1B).

At step 625, a stream selection is based on the stream selection sensor (e.g., second sensor) and the data stream selection information. In one embodiment, the data stream is selected by a stream selector of the electronic device (e.g., compression quality and stream selector 158 of FIG. 3B).

At step 630, each second signal is delayed by the predetermined time. In one embodiment, the streams are delayed a few seconds (e.g., 1-5 seconds). In one embodiment, the streams are delayed by a delay device (e.g., delay device 314 of FIG. 3B). At step 635, one of the delayed second signals is selected based on the stream selection as determined at step 625.

At step 640, the second signal is compressed according to the measure of compression quality to generate a compressed second signal. In one embodiment, the second signal is received at a variable compressor of the electronic device (e.g., variable compressor 124 of FIG. 3B). The variable compressor operates to compress the second signal according to the measure of compression as received from the compression quality selector.

At step 645, the stream selection is delayed by the predetermined time. In one embodiment, the stream selection is delayed a few seconds (e.g., 1-5 seconds). In one embodiment, the stream selection is delayed by a delay device (e.g., delay device 122c of FIG. 3B).

At step 650, all the first signals, the compressed second signal and the stream selection are transmitted by a transmitter of the electronic device (e.g., transmitter 126 of FIG. 3B). In one embodiment, the first signals, the compressed second signal and the stream selection are transmitted by a wireless connection to a client device.

Figure 7:
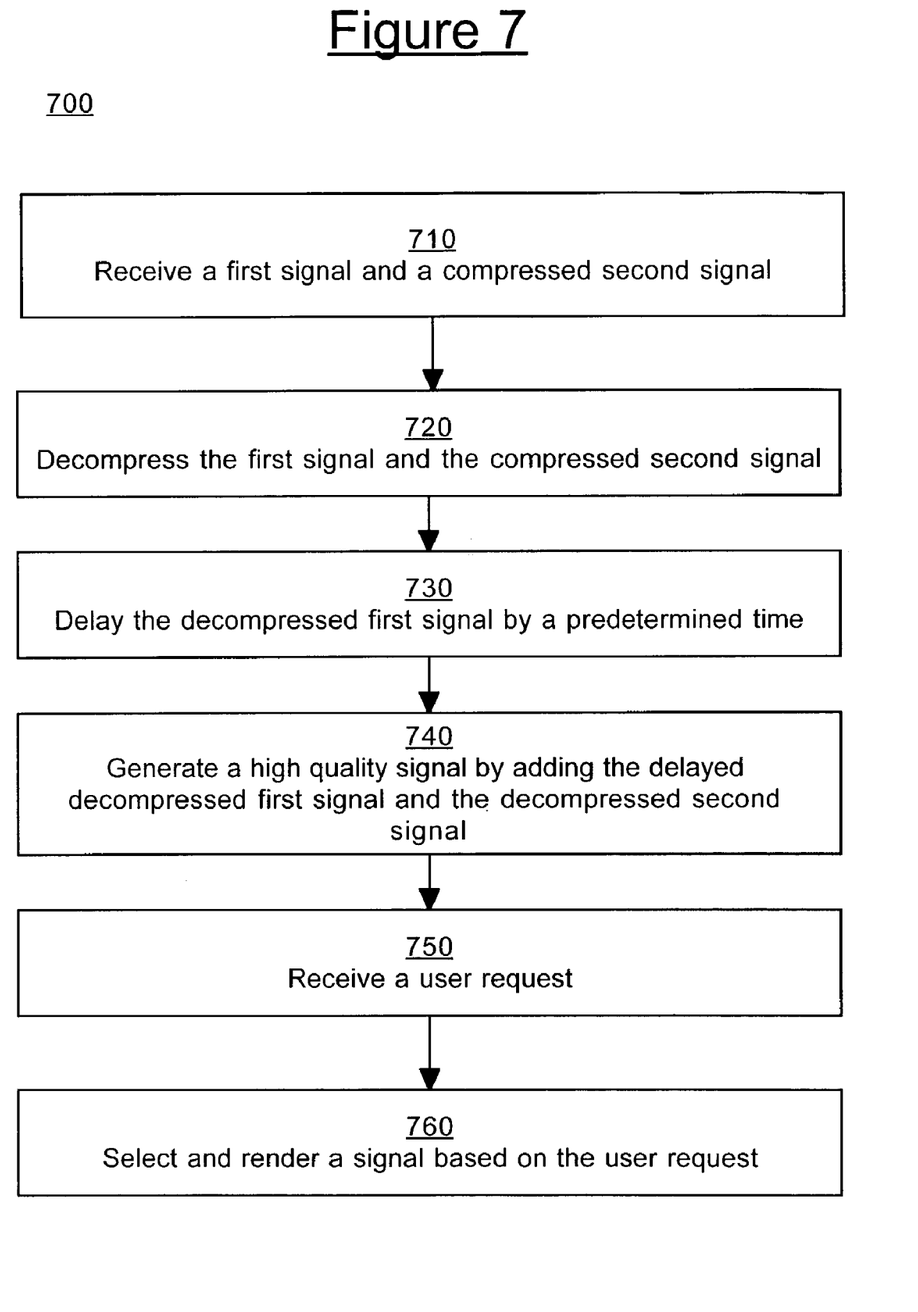
FIG. 7 is a flow chart of a process for selectively rendering streaming media in accordance with one embodiment of the present invention.

FIG. 7 is a flow chart of a process 700 for selectively rendering streaming media in accordance with one embodiment of the present invention. In one embodiment, process 700 is carried out by processors and electrical components under the control of computer readable and computer executable instructions. Although specific steps are disclosed in process 700, such steps are exemplary. That is, the embodiments of the present invention are well suited to performing various other steps or variations of the steps recited in FIG. 7.

At step 710 of process 700, a first signal associated with an event and a compressed second signal associated with the event are received at an electronic device (e.g., electronic device 400 of FIG. 4). In one embodiment, the first signal and compressed second signal are video signals. In one embodiment, the first signal and compressed second signal are received over a wireless connection. In one embodiment, the first signal and the compressed second signal are generated as described in process 500 of FIG. 5.

At step 720, the first signal and the compressed second signal are decompressed. In one embodiment, the first signal and the compressed second signal are decompressed by a decompressor (e.g., decompressors 162 and 164, respectively, of FIG. 4A).

At step 730, the decompressed first signal is delayed by a predetermined time. In one embodiment, the first signal is the same time as predetermined time of step 550 of FIG. 5. In one embodiment, the decompressed first signal is delayed by a delay device (e.g., delay device 166 of FIG. 4A). At step 740, a high quality signal is generated by adding the delayed decompressed first signal to the decompressed second signal.

At step 750, a user request is received. At step 760, a signal is selected and rendered based on the user selection. Provided the user request is for rendering a low quality signal, the first signal is rendered. In one embodiment, the first signal is rendered at an audio/video device of the electronic device (e.g., audio/video device 172 of FIG. 4). Alternatively, provided the user request is for rendering a high quality signal, the high quality signal generated at step 730 is rendered. In one embodiment, the high quality signal is rendered at an audio/video device of the electronic device (e.g., audio/video device 172 of FIG. 4).

Figure 8:
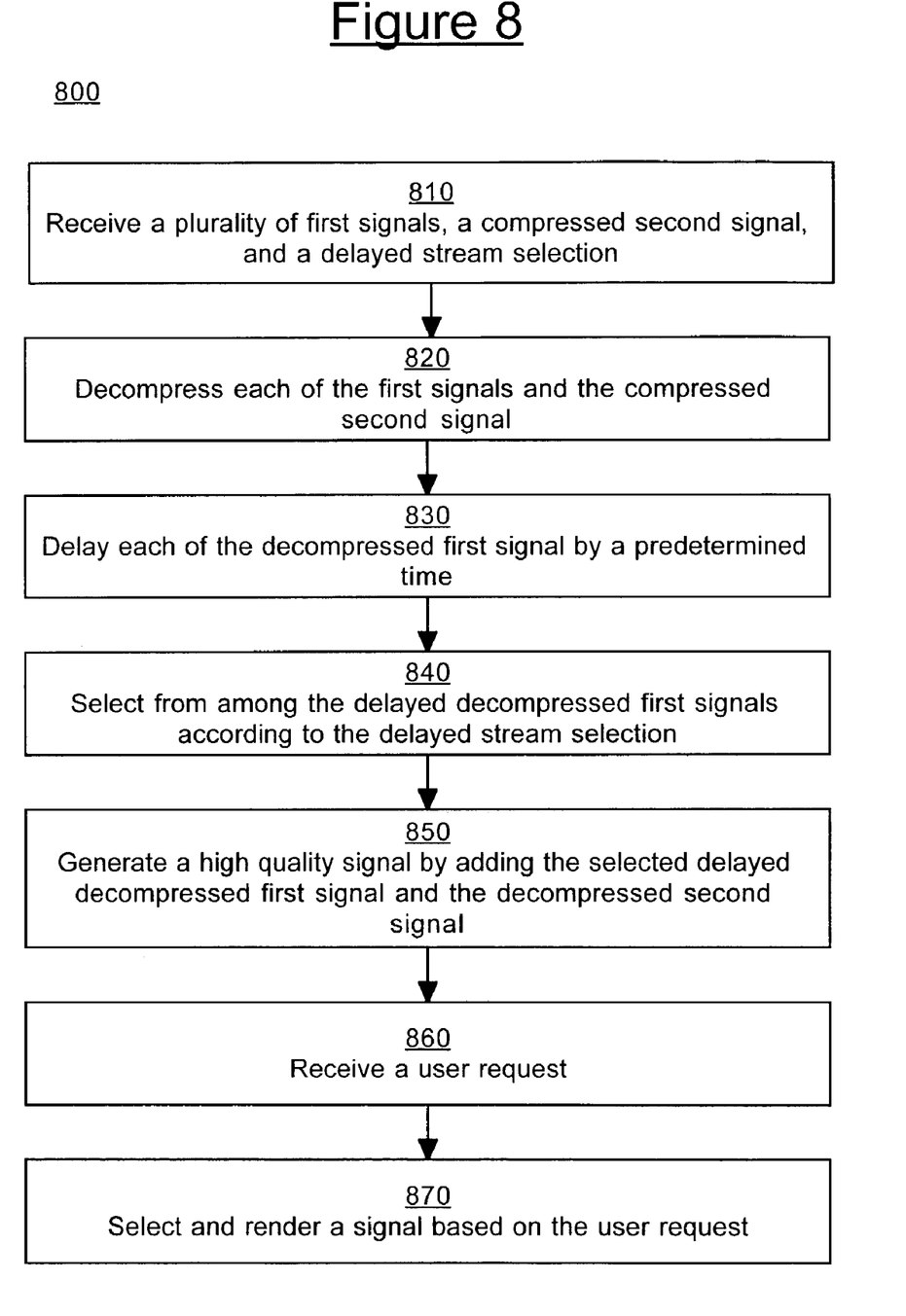
FIG. 8 is a flow chart of a process for selectively rendering streaming media in accordance with another embodiment of the present invention.

FIG. 8 is a flow chart of a process 800 for selectively rendering streaming media in accordance with one embodiment of the present invention. In one embodiment, process 800 is carried out by processors and electrical components under the control of computer readable and computer executable instructions. Although specific steps are disclosed in process 800, such steps are exemplary. That is, the embodiments of the present invention are well suited to performing various other steps or variations of the steps recited in FIG. 8.

At step 810 of process 800, a plurality of first signals associated with an event, a compressed second signal associated with the event, and a delayed stream selection are received at an electronic device (e.g., electronic device 450 of FIG. 4B). In one embodiment, the plurality of first signals and compressed second signal are video signals. In one embodiment, the first signal and compressed second signal are received over a wireless connection. In one embodiment, the plurality of first signals, the compressed second signal and the stream selection are generated as described in process 600 of FIG. 6.

At step 820, the plurality of first signals and the compressed second signal are decompressed. In one embodiment, the plurality of first signals and the compressed second signal are decompressed by a decompressor (e.g., decompressors 162 and 164, respectively, of FIG. 4B).

At step 830, each of the decompressed first signal is delayed by a predetermined time. In one embodiment, the first signal is the same time as predetermined time of step 630 of FIG. 6. In one embodiment, the decompressed first signal is delayed by a delay device (e.g., delay devices 166 of FIG. 4B). At step 840, one delayed decompressed first signal is selected from the plurality of delayed decompressed first signals according to the delayed stream selection. At step 850, a high quality signal is generated by adding the selected delayed decompressed first signal to the decompressed second signal.

At step 860, a user request is received. At step 870, a signal is selected and rendered based on the user selection. Provided the user request is for rendering one of the low quality signals, the selected first signal is rendered. In one embodiment, the selected first signal is rendered at an audio/video device of the electronic device (e.g., audio/video device 182 of FIG. 4). Alternatively, provided the user request is for rendering a high quality signal, the high quality signal generated at step 830 is rendered. In one embodiment, the high quality signal is rendered at an audio/video device of the electronic device (e.g., audio/video device 182 of FIG. 4).

Various embodiments of the present invention, a method for presenting streaming media, are thus described. While the present invention has been described in particular embodiments, it should be appreciated that the present invention should not be construed as limited by such embodiments, but rather construed according to the below claims.

What is claimed is:

1. A method for presenting streaming media, said method comprising:
receiving at least one data stream associated with an event;
receiving event-specific information comprising data stream information identifying at least one data stream associated with said event, compression quality information identifying a measure of compression quality for said data stream associated with said event, and sensor information identifying at least one sensor associated with said event;
receiving a sensor reading from said sensor, said sensor reading indicating a condition related to said event not provided in said data stream;
generating a first signal by compressing said data stream and a second signal based on a difference between said data stream and said first signal;
determining said measure of compression quality for said data stream based on said compression quality information and said sensor reading;

compressing said second signal according to said measure of compression quality; and transmitting said first signal and said second signal.

2. The method as recited in claim 1 wherein said first signal is a low quality signal.

3. The method as recited in claim 1 further comprising delaying said second signal by a predetermined time.

4. The method as recited in claim 1 wherein said first signal and said second signal are transmitted to a client device.

5. The method as recited in claim 4 wherein said first signal and said second signal are transmitted by a wireless connection to said client device.

6. The method as recited in claim 4 further comprising rendering said first signal at said client device.

7. The method as recited in claim 3 wherein said first signal and said second signal are transmitted to a client device.

8. The method as recited in claim 7 wherein said first signal and said second signal are transmitted by a wireless connection to said client device.

9. The method as recited in claim 7 further comprising:
delaying said first signal by said predetermined time;
combining said first signal and said second signal at said client device to generate a high quality data stream; and
rendering said high quality data stream at said client device.

10. A method for presenting streaming media, said method comprising:
receiving a plurality of data streams associated with an event;
receiving event-specific information comprising data stream information identifying said plurality of data streams associated with said event, compression quality information identifying a measure of compression quality for said plurality of data streams associated with said event, sensor information identifying a plurality of sensors associated with said event, and data stream selection information identifying at least one criterion for determining a selected second signal from said plurality of data streams;
receiving a sensor reading from at least one sensor of said plurality of sensors, said sensor reading indicating a condition related to said event not provided in said plurality of data streams;
generating a plurality of first signals by compressing at least two data stream of said plurality of data streams and a plurality of second signals based on a difference between said plurality of data streams and said plurality of first signals;
determining said measure of compression quality for said selected second signal based on said compression quality information and said sensor reading;
determining a selected second signal of said plurality of second signals based on stream selection information;
compressing said selected second signal according to a measure of compression quality; and
transmitting said plurality of first signals, said selected second signal, and said stream selection information.

11. The method as recited in claim 10 wherein said plurality of first signals are low quality signals.

12. The method as recited in claim 10 further comprising:
delaying said plurality of second signals by a predetermined time; and
delaying said stream selection information by said predetermined time.

13. The method as recited in claim 10 wherein said plurality of first signals, said second signal and said stream selection are transmitted by a wireless connection to a client device.

14. An electronic device comprising:
a receiver configured to receive at least one data stream associated with an event;
a first compressor configured to generate a compressed signal based on said data stream and a differential signal based on a difference between said data stream and said compressed signal;
a second compressor for compressing said differential signal according to a measure of compression quality;
a transmitter for transmitting said compressed signal and said differential signal;
a memory unit having stored therein event-specific information for said event, said event-specific information comprising data stream information identifying at least one said data stream associated with said event, compression quality information identifying said measure of compression quality for said data stream associated with said event, and sensor information identifying at least one sensor associated with said event, wherein a sensor reading of said sensor is operable to indicate conditions related to said event not provided in said data stream; and
a compression quality selector configured to determine said measure of compression quality based on said compression quality information and said sensor reading.

15. The electronic device as recited in claim 14 further comprising a first delay device configured to delay said differential signal by a predetermined time.

16. The electronic device as recited in claim 14 wherein said transmitter is configured to transmit said compressed signal and said differential signal to a client device.

17. The electronic device as recited in claim 16 wherein said transmitter is configured to transmit said compressed signal and said differential signal by a wireless connection to said client device.

18. A method for selectively rendering streaming media, said method comprising:
receiving a first signal associated with an event and a second signal associated with said event, wherein said first signal is generated by compressing a data stream and said second signal is generated based on a difference between said first signal and said data stream, wherein said first signal is a live signal and said second signal is delayed by a predetermined time;
delaying an instance of said first signal by a predetermined time;
generating a high quality signal by adding a delayed instance of said first signal and said second signal, such that said high quality signal is delayed by said predetermined time;
receiving a user request;
provided said user request is for rendering a low quality signal, rendering said first signal; and
provided said user request is for rendering a high quality signal, rendering said high quality signal.

19. The method as recited in claim 18 wherein said first signal and said second signal are video signals.

20. The method as recited in claim 18 wherein said first signal and said second signal are received over a wireless connection.

21. An electronic device comprising:
a receiver configured to receive a first signal associated with an event and a second signal associated with said event, wherein said first signal is generated by compressing a data stream and said second signal is generated based on a difference between said first signal and said data stream, wherein said first signal is a live signal and said second signal is delayed by a predetermined time;

a delay device configured to delay an instance of said first signal by a predetermined time;

a signal adder configured to add a delayed instance of said first signal and said second signal to generate a high quality signal, such that said high quality signal is delayed by said predetermined time;

a signal selector configured to render a requested signal based on a user request, wherein said first signal is rendered in response to said user request for a low quality signal and wherein said high quality signal is rendered in response to said user request for said high quality signal; and an audio/video device for rendering said requested signal in response to said user request.

22. The electronic device as recited in claim 21 wherein said first signal and said second signal are video signals.

23. The electronic device as recited in claim 21 wherein said first signal and said second signal are received over a wireless connection.

* * * * *